Figure 1A:
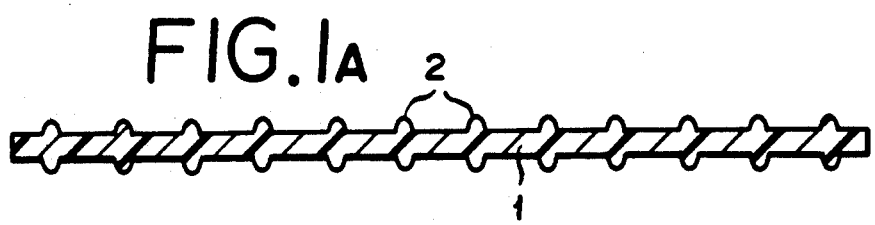

United States Patent [19]
Ohnishi et al.

[11] Patent Number: 5,244,578
[45] Date of Patent: Sep. 14, 1993

[54] BLOOD PLASMA-SEPARATING MEMBRANE AND BLOOD PLASMA SEPARATOR USING THE MEMBRANE

[75] Inventors: Makoto Ohnishi; Kenichi Shimura, both of Ashigarakami, Japan

[73] Assignee: Terumo Kabushiki Kaisha, Tokyo, Japan

[21] Appl. No.: 865,777

[22] Filed: Apr. 6, 1992

Related U.S. Application Data

[63] Continuation of Ser. No. 589,800, Sep. 28, 1990, abandoned.

[30] Foreign Application Priority Data

Sep. 28, 1989 [JP] Japan .................................. 1-253414

[51] Int. Cl.⁵ ............................................. B01D 61/00
[52] U.S. Cl. .................................. 210/650; 210/321.6; 210/321.84; 210/500.27; 210/500.35; 210/500.36; 210/500.42; 210/653; 210/654
[58] Field of Search ............... 210/321.6, 321.84, 490, 210/500.27, 500.36, 500.42, 645, 646, 650, 651, 653, 654, 500.35; 427/245

[56] References Cited

U.S. PATENT DOCUMENTS

| | | | |
|---|---|---|---|
| 4,280,970 | 7/1981 | Kesting | 210/500.36 |
| 4,346,142 | 8/1982 | Lazear | 427/44 |
| 4,413,074 | 11/1983 | Wrasidlo et al. | 210/490 |
| 4,432,875 | 2/1984 | Wrasidlo et al. | 210/500.36 |
| 4,444,662 | 4/1984 | Conover | 210/500.36 |
| 4,618,533 | 10/1986 | Steuck | 427/245 |
| 4,845,132 | 7/1989 | Masuoka et al. | 210/490 |
| 5,028,332 | 7/1991 | Ohnishi | 210/500.34 |
| 5,180,492 | 1/1993 | Ohnishi et al. | 210/500.36 |
| 5,203,997 | 4/1993 | Koyama et al. | 210/500.36 |

FOREIGN PATENT DOCUMENTS

| | | |
|---|---|---|
| 0063897 | 11/1982 | European Pat. Off. |
| 0249513 | 12/1987 | European Pat. Off. |
| 0392010 | 10/1990 | European Pat. Off. |
| 62-290469 | 12/1987 | Japan |
| 63-226364 | 9/1988 | Japan |
| 8201553 | 5/1982 | World Int. Prop. O. |
| 8809200 | 12/1988 | World Int. Prop. O. |

Primary Examiner—Robert A. Dawson
Assistant Examiner—Sun Uk Kim
Attorney, Agent, or Firm—Burns, Doane, Swecker & Mathis

[57] ABSTRACT

A blood plasma-separating membrane formed of a porous membrane possessing a wetting time in the range of 3 to 500 seconds relative to water and a non-priming grade blood plasma separator using the same.

6 Claims, 5 Drawing Sheets

BLOOD PLASMA-SEPARATING MEMBRANE AND BLOOD PLASMA SEPARATOR USING THE MEMBRANE

This application is a continuation of application Ser. No. 07/589,800, filed Sep. 28, 1990, now abandoned.

BACKGROUND OF THE INVENTION

1. Field of the Invention

This invention relates to a blood plasma-separating membrane and a blood plasma separator using the membrane. More particularly, it relates to a blood plasma-separating membrane to be used in the therapy of blood plasma replacement or for the collection of blood plasma from a donor or from a blood bag and to a method for blood plasma separation which obviates the necessity for priming.

2. Description of the Prior Art

The method of blood plasma separation for separating the blood into the blood cell component and the blood plasma component is used for numerous medical purposes such as, for example, the blood plasma replacement which comprises isolating blood plasma from the blood of a patient who has the cause for disease in the blood plasma component and discarding the isolated blood plasma or replacing it with the blood plasma from a normal healthy person, the blood plasma collection which comprises collecting the blood plasma from the blood of a normal healthy person, and the blood plasma separation rom the preserved blood which comprises separating the preserved blood into the blood cell component and the blood plasma component.

Generally, the method of separation with a membrane is advantageous over the method of centrifugal separation in respect that the apparatus is inexpensive and the operation of separation suffers from no leakage of the blood cell component into the separated blood plasma component. It requires the membrane type blood plasma separator, preparatory to use, to be filled with a large amount of physiological isotonic liquid so as to purge the interior of the device and expel bubbles from the device. This preparatory treatment is called a "priming." This operation, therefore, constitutes itself a drawback from the economical and procedural points of view. Further, since the collected blood plasma is destined to be diluted with the physiological isotonic liquid, this method has another disadvantage that the blood plasma collected at all is not fully satisfactory in quality. The method of separation using the membrane, therefore, is desired to obviate the necessity for giving the separating device such purging and priming treatments as with a physiological isotonic liquid preparatory to use.

When the membrane for separating blood components is made of a hydrophobic material, it allows no passage therethrough of blood plasma rom the introduced blood only unless water is present in the pores of the membrane. In contrast, the membrane made of a hydrophilic material, as described in JP-A-62-290,469(1987), allows safe passage of blood plasma therethrough and yet has the disadvantage that it causes hemolysis during the introduction of blood. Specifically, when the priming treatment of the separator is omitted and the blood is brought into direct contact with the porous membrane in a dry state, since capillarity is initiated instantaneously on the surface of the porous membrane and the blood plasma component is suddenly absorbed in the interior of the porous membrane and then passed externally through the porous membrane, the red blood cells which are incapable of passing through the pores in the membrane are dissolved on the surface of the membrane. Hence the phenomenon of hemolysis entailing liberation of hemoglobin. This phenomenon of hemolysis not only impairs the quality of the collected blood plasma but also jeopardizes the safety of the patient or the donor.

As means to avoid the degradation of the quality of the collected blood plasma in consequence of this phenomenon of hemolysis or due to the use of physiological isotonic liquid for the priming treatment, a membrane type blood plasma separator and a blood component collecting set have been proposed by JP-A-62-290,469(1987) and JP-A-63-226,364(1988). The blood plasma separator, however, is finished by a procedure which comprises causing the interior of the separator to be filled with physiological isotonic liquid and then expelling the charged liquid out of the separator interior with compressed air. It, therefore, has as a problem the complication of process of manufacture and entails the disadvantage that the physiological isotonic liquid inevitably suffered to remain inside the pores demands due consideration as to preservation of quality, deterioration by aging, and safety.

An object of the present invention, therefore, is to provide a novel blood plasma-separating membrane, a blood plasma separating-membrane unit, a blood plasma separator, and a method for blood plasma separation.

Another object of this invention is to provide a blood plasma-separating membrane, a blood plasma-separating membrane unit, a blood plasma separator, and a method for blood plasma separation, which obviate the necessity for a complicated priming treatment with a physiological isotonic liquid preparatory to use, avoid inducing the phenomenon of hemolysis even when the blood is directly introduced thereto for the isolation of blood plasma, and exclude the otherwise possible dilution of the separated blood plasma with the physiological isotonic liquid.

SUMMARY OF THE INVENTION

These objects are accomplished by a blood plasma-separating membrane formed of a porous membrane having a wetting time in the range of 3 to 500 seconds relative to water.

This invention further discloses a blood plasma-separating membrane having a wetting time in the range of 3 to 500 seconds relative to water, which membrane is a porous membrane formed by applying to a hydrophobic porous substrate of a coating of a polymeric compound possessing specific hydrophilicity. This invention further discloses a blood plasma-separating membrane, wherein the hydrophobic porous material is made of a polyolefin, a polyolefin having part or all of the hydrogen atoms thereof halogenated, or a polyvinylidene fluoride and the polymeric compound possessing specific hydrophilicity is a polymer formed mainly of a homopolymer or copolymer of an alkoxyalkyl (meth)acrylate or a copolymer of a hydrophilic monomer with a hydrophobic monomer. This invention further discloses a blood plasma-separating membrane, wherein the alkoxyalkyl (meth)acrylate mentioned above is methoxyethyl acrylate.

The objects described above are also accomplished by a non-priming grade blood plasma separator, comprising a vessel provided with a blood inlet, a blood outlet, and a blood plasma outlet and a porous membrane possessing a wetting time in the range of 3 to 500 seconds relative to water and adapted to partition the interior of the vessel into two empty spaces, the first empty space communicating with the blood inlet and the blood outlet and the second empty space communicating with the blood plasma outlet.

This invention further discloses a blood plasma separator, therein the porous membrane is formed by applying to a hydrophobic porous substrate a coating of a polymeric compound possessing predetermined hydrophilicity and allowed to possess a wetting time in the range of 3 to 500 seconds relative to water. This invention further discloses a blood plasma separator, wherein the hydrophobic porous material is made of a polyolefin, a polyolefin having part or all of the hydrogen atoms thereof halogenated, or a polyvinylidene fluoride and the polymeric compound possessing specific hydrophilicity is a polymer formed mainly of a homopolymer or copolymer of an alkoxyalkyl (meth)acrylate or a copolymer of a hydrophilic monomer with a hydrophobic monomer. This invention further discloses a blood plasma separator, wherein the alkoxyalkyl (meth)acrylate is methoxyethyl acrylate.

This invention is directed to a porous blood plasma-separating membrane possessing a wetting time in the range of 3 to 500 seconds relative to water, a blood plasma-separating membrane unit using the aforementioned membrane, a blood plasma separator using the aforementioned membrane or the aforementioned unit, and a method for blood plasma separation using the aforementioned blood plasma separator. Unlike the conventional hydrophilic porous membrane, the blood plasma-separating membrane of this invention has a long wetting time. In the separation of blood plasma to be performed, by the non-priming method, even when the blood is brought into direct contact with the porous membrane in a dry state, it is not abruptly absorbed but gradually absorbed into the pores and, as the result, the otherwise inevitable phenomenon of hemolysis can be curbed. Further, the ratio of recovery of protein can be conspicuously improved because the separated blood plasma is not diluted either by priming liquid or with the filling liquid.

BRIEF DESCRIPTION OF THE INVENTION

Figure 1B:
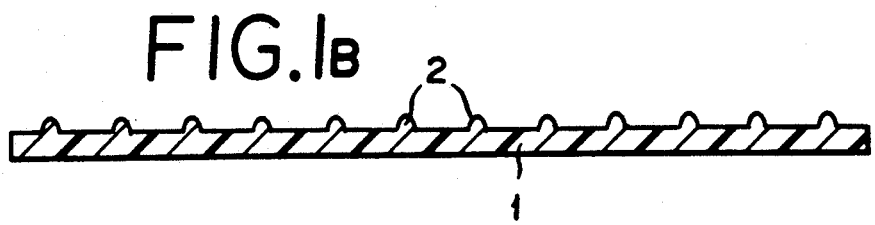
Figure 1C:
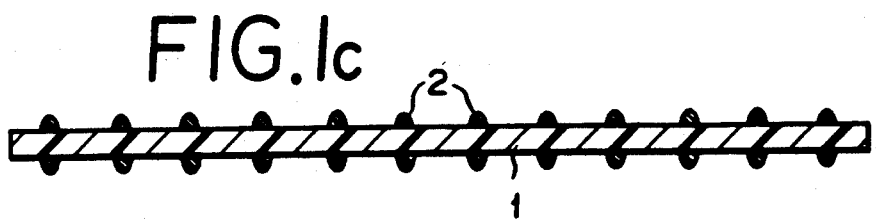
Figure 1D:
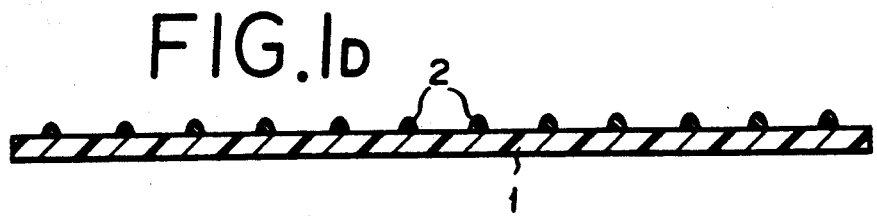
Figure 2:
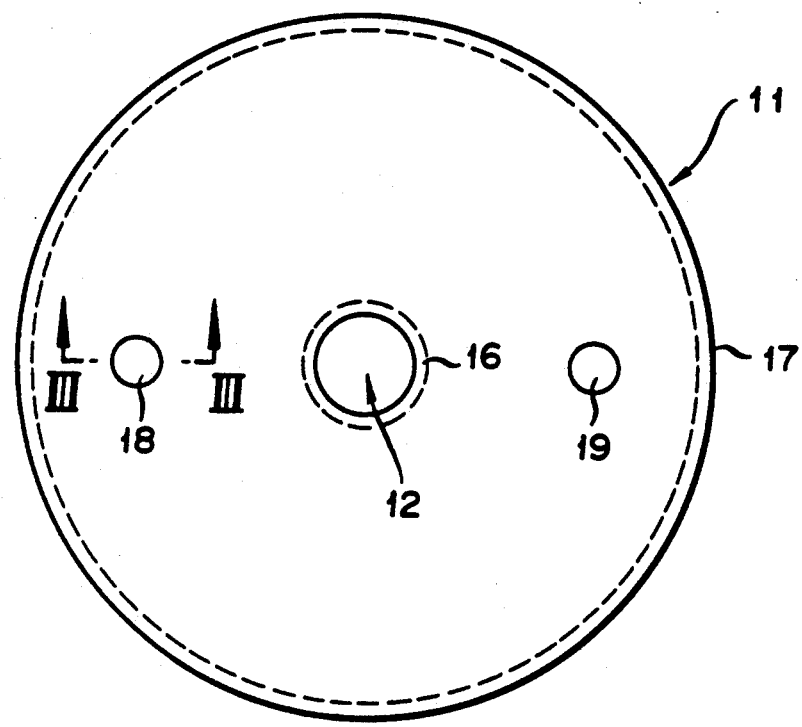
Figure 3:
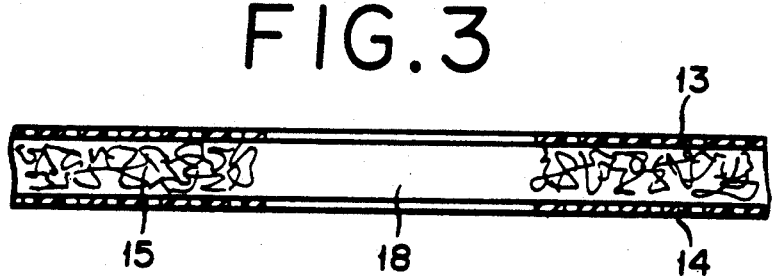
Figure 4:
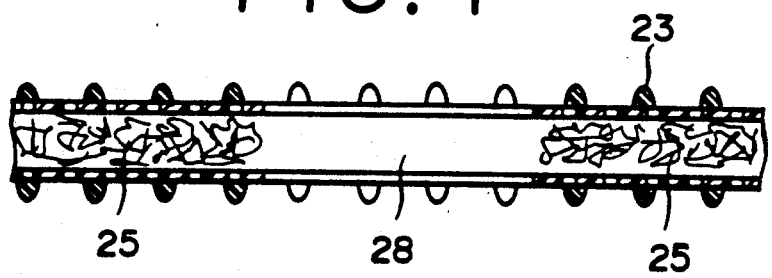
Figure 5:
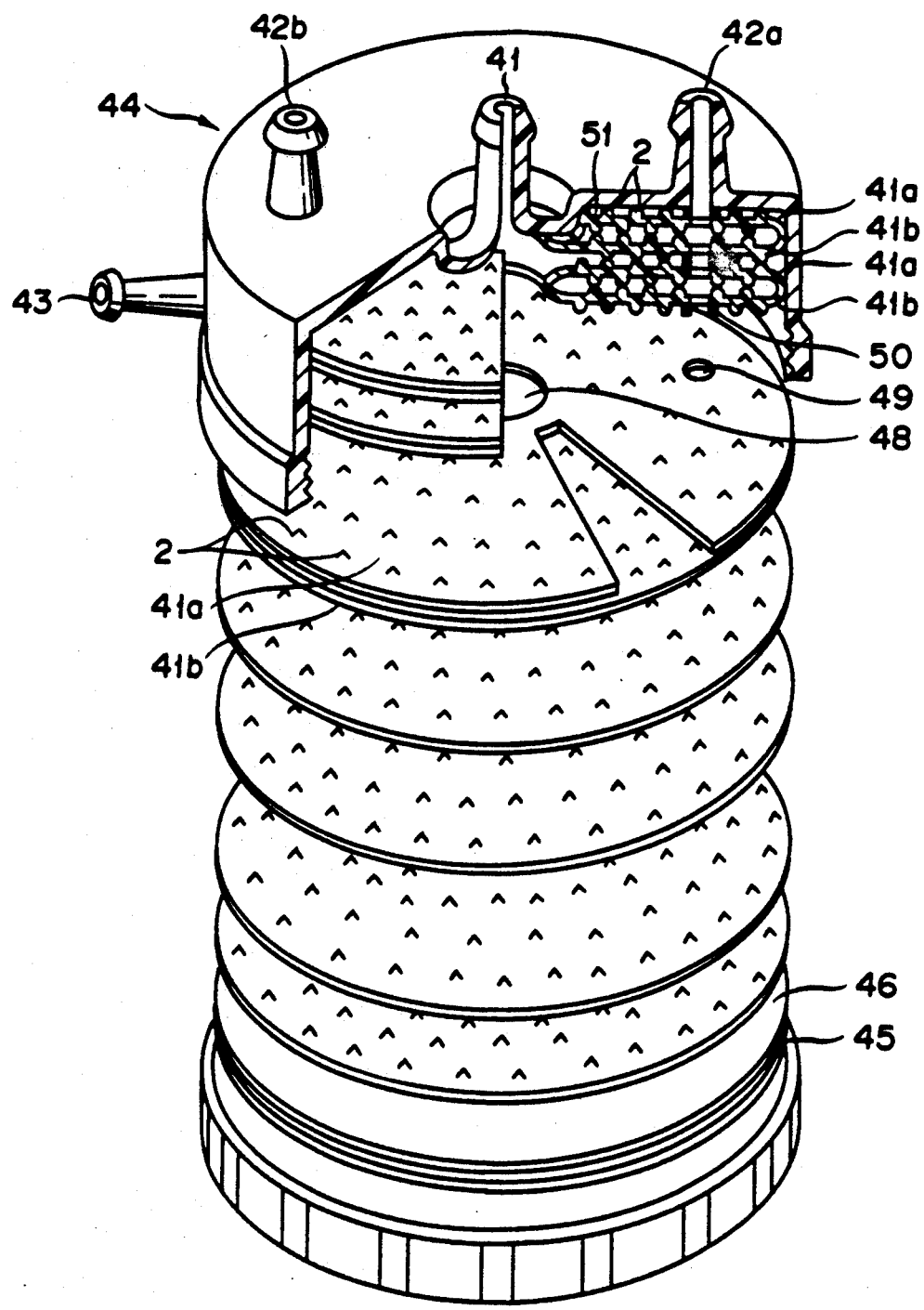
Figure 6:
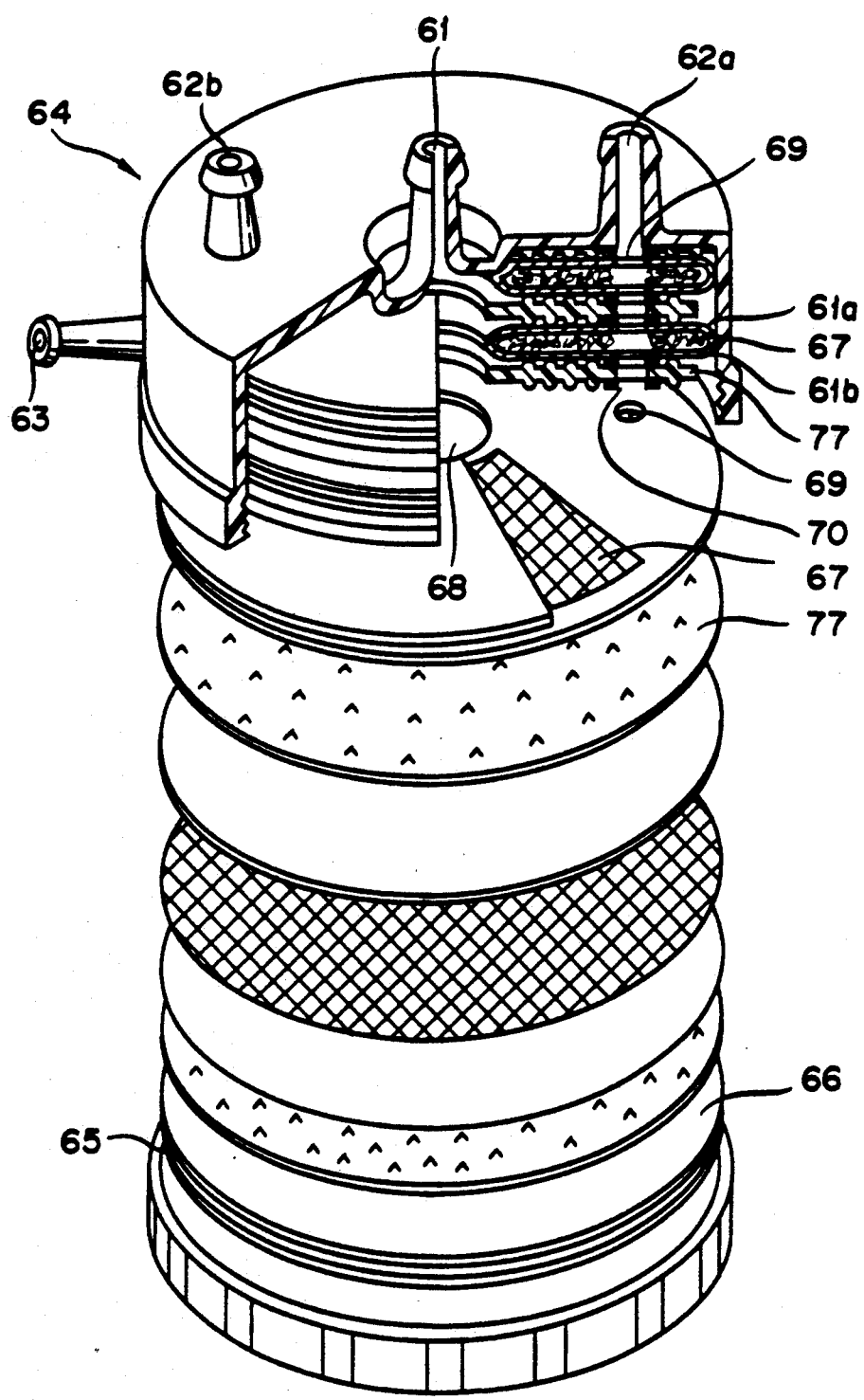
Figure 7:
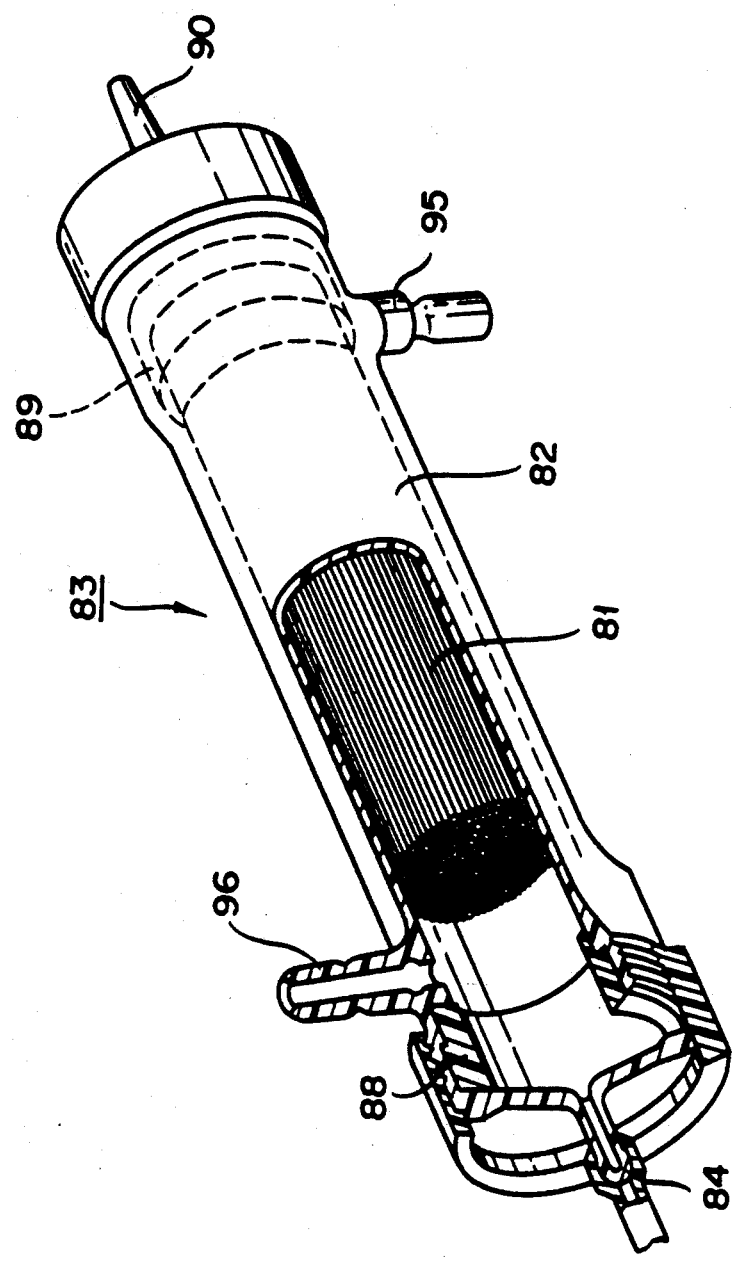

FIGS. 1A to 1D are magnified cross sections each illustrating a flat-membrane type porous substrate to be used in a blood plasma-separating membrane of the present invention, FIG. 2 is a top view illustrating a typical blood plasma separator of the present invention, FIG. 3 is a magnified cross section taken through FIG. 2 along the line III—III, FIG. 4 is a magnified cross section illustrating another embodiment similarly to FIG. 3, FIG. 5 is an exploded perspective view illustrating a typical blood plasma separator of the present invention, FIG. 6 is an exploded perspective view illustrating another blood plasma separator of this invention, and FIG. 7 is a partially cutaway perspective view illustrating yet another blood plasma separator of this invention.

EXPLANATION OF THE PREFERRED EMBODIMENT

For the non-priming grade blood plasma-separating membrane of the present invention, it is essential that the wetting time of the membrane with water should be in the range of 3 to 500 seconds, preferably 5 to 60 seconds. The term "non-priming grade blood plasma-separating membrane" as used herein refers to a blood plasma-separating membrane for separating blood plasma from the blood brought into direct contact with a porous membrane in a dry state without requiring any priming treatment.

The expression "wetting time of a membrane relative to water" as used herein means the time required for a liquid under treatment to impregnate empty pores in the membrane, determined in accordance with the Method B of ASTM D 4199-82. In the case of a membrane of the shape of a flat sheet, the value of wetting time obtained by performing the determination generally at a temperature of 25°±2° C. exactly in the procedure specified is reported (providing that in the case of a membrane made of a material showing a marked difference between the wetting time at the actual working temperature specified for the membrane and the wetting time measured at 25° C., the wetting time at the actual working temperature will be adopted). In the case of a membrane in the shape of a hollow fiber, the value of wetting time is obtained by preparing a sample hollow fiber about 5 cm in length having one end thereof closed and immersed in water so as to facilitate escape of the air from the empty pores in the membrane into the hollow core of the hollow fiber, keeping the other end of the hollow fiber out of water, and clocking the time required for the hollow fiber to be thoroughly wetted with the water in the same manner as in the membrane of the shape of a flat sheet. Such hydrophilic porous membranes as regenerated cellulose membrane, cellulose acetate membrane, polyvinyl alcohol membrane, and ethylenevinyl alcohol membrane which are generally available in the market have wetting times not exceeding 2 seconds and, therefore, are wetted substantially instantaneously. If a membrane has a wetting time of less than 3 seconds, the hydrophilicity of the membrane is so high that when the membrane is exposed to blood, the blood plasma is abruptly absorbed into the pores of the membrane and the remainder of the blood is consequently liable to undergo hemolysis. Conversely, if the wetting time exceeds 500 seconds, the hydrophobicity of the membrane is so high that the time which precedes the start of filtration of blood plasma through the membrane is too long for the use of the membrane to be economically feasible.

The blood plasma-separating membrane possessing a wetting time falling in the specific range mentioned above is required to have special surface properties ignored in the conventional blood plasma-separating membranes. The membranes fulfilling these requirements include copolymers using a hydrophilic monomer and a hydrophobic monomer in a specific ratio such as, for example, 1:5 to 5:1, preferably 1:3 to 3:1, graft polymers, and block polymers, for example. Cross-linked polymers of the hydrophilic monomers usable in the aforementioned copolymers may be other examples. The hydrophilic cross-linked polymers include copolymers between hydrophilic monomers and monomers possessing at least two double bonds in the molecular unit thereof and those polymers which are produced by cross-linking hydrophilic polymers with polyfunctional monomers possessing such functional groups as epoxy group and isocyanate group, for example.

The hydrophilic monomers which are effectively usable herein include acrylamide, N,N-dimethyl acrylamide, N,N-diethyl acrylamide, aminomethyl acrylate, aminoethyl acrylate, aminoisopropyl acrylate, diaminomethyl acrylate, diaminoethyl acrylate, diaminobutyl acrylate, methacrylamide, N,N-dimethyl methacrylamide, N,N-diethyl methacrylamide, aminomethyl methacrylate, aminoethyl methacrylate, diaminomethyl methacrylate, and diaminoethyl methacrylate, for example. The hydrophobic monomers which are effectively usable herein include acrylate, ethyl acrylate, isopropyl acrylate, butyl acrylate, 2-ethylhexyl acrylate, methyl methacrylate, ethyl methacrylate, and butyl methacrylate for example. Besides, homopolymers and copolymers of such alkoxyalkyl (meth)acrylates as methoxymethyl acrylate, methoxyethyl acrylate, methoxypropyl acrylate, ethoxymethyl acrylate, ethoxyethyl acrylate, ethoxypropyl acrylate, ethoxybutyl acrylate, propoxymethyl acrylate, butoxyethyl acrylate, methoxybutyl acrylate, methoxymethyl methacrylate, methoxyethyl, methacrylate, ethoxymethyl methacrylate, ethoxyethyl methacrylate, propoxymethyl methacrylate, and butoxyethyl methacrylate, for example, are also effectively usable herein.

From the standpoint of stability and safety of the quality of the separated blood plasma, however, it is undesirable to use for the membrane any polymer which is peeled or dissolved out with water, alcohol, or a mixed solvent thereof. Then, from the standpoint of activation of the complement system, it is preferable that any material of a compound possessing a hydroxy group should avoid contacting the blood under treatment.

The blood plasma-separating membrane possessing the surface properties mentioned above is generally produced by applying to a hydrophobic porous substrate a coating of a macromolecular compound possessing specific hydrophilicity. The coating of the macromolecular compound thus formed exhibits a wetting time in the range of 3 to 500 seconds to water.

The materials which are usable effectively herein for the hydrophobic substrate include polyethylene, polypropylene, polystyrene, polymethyl methacrylate, polycarbonate, polyvinylidene chloride, polyvinyl chloride, and polysulfone, for example. This substrate may be in the shape of a hollow fiber or a flat sheet, whichever suits the actual use contemplated better. The hollow-fiber membrane or the flat membrane is desired to have a pore diameter in the range of 0.02 to 2 $\mu$m, preferably 0.05 to 1.0 $\mu$m, a wall thickness in the range of 10 to 1,000 $\mu$m, preferably 10 to 300 $\mu$m, and a porosity in the range of 20 to 90%, preferably 40 to 80%.

Though the flat-membrane type polymeric substrate may be in the shape of a substantially completely flat sheet, it is allowed to be provided on at least one surface thereof with a plurality of minute projections 2 as illustrated in FIGS. 1A to 1D. In the flat-membrane type substrate of the present invention, the minute projections 2 may be disposed on only one surface of membrane as illustrated in FIG. 1B and FIG. 1D or on both surfaces of membrane as illustrated in FIG. 1A and FIG. 1C; depending on the position at which the polymeric substrate is located, the purpose of use of the substrate, etc. The shape of the minute projections 2 is not specifically defined. The minute projections 2 may be in the shape of dots, lines, or a lattice, for example. These minute projections are preferable to have a height H in the range of 20 to 1,000 $\mu$m, preferably 60 to 200 $\mu$m. The ratio of the surface are occupied by the parts of these minute projections 2 to the surface area of the surface on which the minute projections 2 are formed is desired to be in the range of 0.5 to 50%, preferably 1.0 to 20%. If the height H of the minute projections 2 is less than 20 $\mu$m, the minute projections 2 do not fully function as a spacer and do not easily secure a stable flow path thickness. Conversely, if the height H of the minute projections 2 exceeds 1,000 $\mu$m, the minute projections 2 are liable to deform heavily and cause an error and, moreover, entail a problem in terms of priming volume. If the area occupied by the parts of the minute projections 2 accounts for a proportion of less than 0.5%, the polymeric substrate cannot be prevented fully satisfactorily from deformation. Conversely, if this area accounts for a proportion exceeding 50%, the possibility arises that the capacity for permeation will not be obtained sufficiently because of a decrease in the area available for permeation.

In the flat-membrane type polymeric substrate of the present invention, the parts of minute projections 2 may be formed of one and the same material as the main body of polymeric substrate 1 as illustrated in FIGS. 1A and 1B or a material different from the material of the main body of polymeric substrate 1 as illustrated in FIGS. 1C and 1D. Preferably, the parts of minute projections 2 are formed of a material possessing a Young's modulus in the range of $1.0 \times 10^6$ to $2.0 \times 10^{10}$ dynes/cm$^2$, preferably $1.0 \times 10^6$ to $1.0 \times 10^9$ dynes/cm$^2$. The reason for this specific Young's modulus is that when a plurality of modular flat-membrane type polymeric substrates are superposed, the flow path thicknesses interposed between the adjacent polymeric substrates proper 1 can be readily narrowed by application of pressure and, on release of the applied pressure, can be automatically restored reversibly to their former state and, as a result, the desired volume of permeation can be easily obtained. It is known that generally in the superposition type modules of this sort, the more the sliding speed increases, the more the concentration polarization decreases, and consequently the property of passing a substance improves in accordance as the thickness of flow path for a liquid under treatment is decreased. Where the thickness of flow path is varied by application of pressure, the possibility arises that the adjustment of the thickness of flow path to a desired level will be attained only with difficulty and the desired volume of permeation will not be obtained at all.

The flat-membrane type polymeric substrate constructed as described above is produced as follows. When a dope of the polymeric compound molded in the shape of a flat membrane is solidified to produce the substrate, at least one surface of the molded dope still in an unsolidified state is placed in contact with a mold surface provided with a plurality of minute depressions so that the consequently produced solidified permeable membrane will be furnished with as many minute projections as the depressions on that surface. This method of production can be employed wherever the permeable membrane proper 1 and the parts of minute projections 2 are allowed to give rise to the polymeric substrate and they are formed of a material which is initially in the state of a fluid such as, for example, a melt or a solution and which is solidified during the course of solidification of certain sort such as solidification by cooling, solidification by extraction of solvent, or solidification by expulsion of derivative. The impartation of permeability to the permeable membrane may be attained by any means of filler, and the mechanical elongation are examples. No particular shape is specified for the mold possessed of a mold surface containing a plurality of depressions and used for the production of the permeable membrane herein. The mold may be in the shape of a flat plate or in the shape of a roller. The shape of the mold can be selected so as to suit the particular process in which the unsolidified dope placed in the mold is solidified. The mold surface which contains the plurality of minute depressions is copied on the surface of the permeable membrane when the unsolidified dope is solidified into an integral membrane. As the result, the desired minute projections are formed on the surface of the permeable membrane. Depending on the shape of the minute projections desired to be obtained, the minute depressions are desired to have a depth in the range of 20 to 1,000 82 m, preferably 60 to 200 μm, and the surface area occupied by the parts of the minute depressions is preferable to account for a proportion in the range of 0.5 to 50%, preferably 1.0 to 20%, of the surface area of the mold surface.

No particular method is specified for the deposition of the membrane of a polymeric compound on the surface of the hydrophobic substrate for the production of a membrane possessing a wetting time in the aforementioned range relative to water. The method which comprises coating the surface of the substrate with a solution of the polymeric compound synthesized in advance, the method which comprises insolubilizing the solution of the macromolecular compound by cross-linking, the method which comprises graft polymerizing the monomers mentioned above, the method which resorts to plasma polymerization, etc. are available for this purpose. The membrane which is produced by supplying the monomers in a gaseous form to a porous substrate possessing in at least part of the surface thereof such points as initiating graft polymerization and consequently causing the gaseous monomers to be graft polymerized on the surface of the substrate proves to be preferable. The expression "points for initiating graft polymerization" as used herein means that when the monomers possess double bonds in the molecular units thereof and, therefore, are capable of causing radical polymerization, the membrane is required to be capable of producing a polymer radical on the surface thereof. The means available for the formation of a polymer radical include electron beam, gamma ray, ultraviolet light, plasma, ozone, and a radical-forming agent (hydrogen extractant), for example. The method fusing an electron beam or plasma proves to be particularly desirable because it permits the blood plasma-separating membrane to be produced by a dry process which comprises supplying the monomers in a gaseous form and allowing the surface graft polymerization to proceed in the form of solid-gaseous polymerization.

The macromolecular compound membrane formed as described above and possessed of specific water-wetting property has a thickness of not more than 10 μm, preferably not more than 1 μm. A blood plasma-separating membrane unit 11 is produced by opposing two flat-membrane type blood plasma-separating membrane obtained as described above across a flow path-forming member 15 such as non-woven fabric or net interposed therebetween and heat-sealing peripheral parts 17 and peripheral parts 16 defining the central through hole 12 as illustrated in FIGS. 2 and 3. This unit 11 is provided generally with a plurality of through holes 18 and 19 for allowing circulation of blood within the flow path. The aforementioned flow path-forming member 15 is formed of a coarsely meshed non-woven fabric or net and adapted to function as a gap-retaining member for keeping between the opposed substrates 13, 14 a gap as a flow path for a fluid.

FIG. 4 is a cross section illustrating a porous substrate similar to the substrate of FIG. 3, except that minute projections 2 are formed on the surface thereof. In FIG. 4, the reference numerals which equal the sums of the reference numerals used in FIGS. 2 and 3 plus 10 denote the identical parts.

The blood plasma-separating membrane unit is used as follows. Inside a case comprising a cylindrical case proper 44 provided in the central part of an upper plate thereof with a blood inlet 41, in the outer peripheral part of the upper plate thereof with a blood plasma outlet 42a and 42b, and in the lateral wall thereof with a blood outlet 43 and a bottom lid member 46 having an O-ring fitted along the peripheral edge thereof, a plurality of blood plasma-separating membrane units 51 each formed by vertically opposed two flat membrane type blood plasma-separating membranes 41a, 41b each incorporating in the outer side thereof a membrane of polymeric compound of the present invention having a plurality of minute projections 2 formed on both surfaces thereof, sealing the outer peripheral parts of the opposed membranes and the inner peripheral parts thereof defining the central opening part, and applying a sealing member 50 to the outer periphery of a blood plasma-passing hole 49 are superposed as illustrated in FIG. 5. When the blood plasma-separating membranes 41a, 41b of this invention are used as described above, the blood plasma-separating membranes are separated from each other by being prevented from directly contacting each other and the blood flow paths formed by the intervals of the minute projections 2 between the adjacent blood plasma-separating membrane units 51 and the blood plasma flow paths formed by the intervals of the minute projections 1 inside the individual units 51 are properly retained owing to the plurality of minute projections 2 present on the surfaces of the blood plasma-separating membranes. By the same token, the A liquid flow paths formed by the intervals of the minute projections 2 between the upper surface of the uppermost unit 51 and the upper inner surface of the case and between the lower surface of the lowermost unit 51 and the bottom inner surface of the case are properly retained.

Thus, the blood plasma separator is formed. The isolation of blood plasma from blood by the use of this blood plasma separator is carried out as follows, for example. Specifically, as illustrated in FIG. 5, the blood supplied through the blood inlet 41 flows into the empty spaces between the blood plasma-separating membrane units, permeates the blood plasma-separating membranes, flows into the empty space between the blood plasma-separating membranes 41a, 41b of each of the units, passes through a blood plasma passing orifice 49, and finds its way out through the blood plasma outlets 42a, 42b. In the meantime, the blood containing blood cells is discharged through the blood outlet 43.

This flow of blood may be reversed to supply the blood through the blood plasma outlet 42a (or 42b), release the blood plasma through the blood inlet 43, and discharge the blood through the blood plasma outlet 42b (or 42a). In this case, it is preferable that layers of polymeric compound membrane should be formed on the inner surfaces of the aforementioned units. In any event, it is necessary that the polymeric membranes should be formed on the surfaces of the sides which the blood is destined to contact first.

It is permissible to use blood plasma-separating membrane units (FIGS. 2 and 3) which are not provided with any minute projection as illustrated in FIG. 6. In this case, it is necessary that a spacer 77 should be interposed between the adjacent units. As the spacer 77, generally a sheetlike article provided on both surfaces thereof with minute projections as illustrated in FIG. 1A and FIG. 1C is used. In FIG. 6, the reference numerals which equal the sums of the reference numerals used in FIG. 5 plus 20 denote identical component parts.

When a hollow fiber membrane is used as a polymeric substrate, a blood plasma separator 83 is assembled by packing a cylindrical main body 82 of blood plasma separator with hollow fiber type blood plasma-separating membranes 81 having a layer of polymeric compound membrane formed on both surfaces and/or on one surface thereof and fixing the opposite ends of the bundle of the membranes 81 with a potting agents 88, 89. When blood is introduced as pressed through one port 84 of this blood plasma separator 83, it flows into the hollow fibers and comes into contact with the aforementioned layers of polymeric compound membrane (not shown). Consequently, the blood plasma permeates the hollow fiber type blood plasma-separating membranes and the blood containing blood cells is discharged through the other port 90. In consequence of the operation performed as described above to pass the blood plasma through the hollow fiber type blood plasma-separating membranes 81 and discharge it through the blood plasma outlets 95, 96, the blood plasma is recovered.

This flow of blood may be reversed to supply the blood through the blood plasma outlet 95 or 96, recover the blood plasma through the ports 84 and 90, and discharge the blood containing blood cells through the outlet 96 or 95. In any event, it is necessary that the polymeric compound membranes possessed of the aforementioned wetting property should be formed on the sides which the blood is destined to contact first.

The blood plasma separator of the present invention is characterized by possessing the construction described above, incorporating in a supported state therein blood plasma-separating membranes possessing a wetting time in the range of 3 to 500 seconds, preferably 5 to 60 seconds, relative to water, and inducing no hemolysis even in case of non-priming directly supply of blood in the state in which the pores in the blood plasma-separating membranes are neither filled nor impregnated with a physiological isotonic liquid. When the blood is supplied while the pores in the blood plasma-separating membranes are neither filled nor impregnated with a physiological isotonic liquid, the blood is destined to contact directly the porous membrane which is in a dry state. The blood plasma separator of the present invention enjoys the heretofore unattainable characteristic quality of inducing no hemolysis even when it is put to use under such harsh conditions as mentioned above. The fact that no hemolysis is caused means that the free hemoglobin concentration in the isolated blood plasma is substantially equal to that in the blood before the separation and is on the practically safe level. It further means that the free hemoglobin concentration in the isolated blood plasma is not impaired by aging but is allowed to remain under a constant level, namely that the phenomenon of hemolysis which is observed during the initial stage of filtration in the blood plasma separator using the conventional hydrophilic membrane does not occur.

Now, the present invention will be described more specifically below with reference to working examples.

EXAMPLE 1

In a biaxial extruding device (produced by Ikegai Iron Works, Ltd.), 100 parts by weight of a mixture of polypropylene species having melt flow indexes (M.I.) of 30 and 0.3 (100:40 by weight ratio), 400 parts by weight of liquid paraffin (number average molecular weight 324) as an organic filler, and 0.3 part by weight of 1,3,2,4-bis(p-ethyldibenzylidene)-sorbitol as a crystal seed-forming agent were melt mixed and pelletized. By the use of the same extruding device, the pellets were melted at a temperature in the range of 150° to 220° C., extruded through a T-die 0.6 mm in slit width into the open air, guided into a cooling and solidifying liquid of polyethylene glycol by the rotation of a guide roller of a cooling liquid tank disposed directly below the T die, cooled and solidified therein, and then taken up in a roll. The filmy web thus taken up was cut into a piece of a fixed length. The piece was fixed in the two directions of longitudinal and lateral axes and immersed a total of four times each for 10 minutes in 1,1,2-trichloro-1,2,2-trifluoroethane to expel the liquid paraffin by extraction. It was then heat-treated in the air at 135° C. for 2 minutes. Consequently, a porous membrane of polypropylene having a pore diameter of 0.45 $\mu$m and a wall thickness of 120 $\mu$m was obtained. The porous membrane obtained as described above was exposed for 15 seconds to low-temperature plasma (Ar; 0.1 torr) and then subjected to surface graft polymerization at a temperature of 288° K. with N,N-dimethyl acrylamide supplied under 0.8 torr for 3 minutes and after eliminating unreacted monomer subsequently with ethyl acrylate supplied under 2.0 torr for 4 minutes.

The resultant membrane was washed with the solvent (produced by Asahi Glass Company, Ltd. and marketed under trademark designation of "Resisolve") for 2 days and dried, to afford a porous membrane having a hydrophilic polymeric compound (poly-N,N-dimethyl acrylamide) and a hydrophobic polymeric compound (polyethyl acrylate) deposited on the surface of the membrane and on the surface of the pores in the membrane. In the porous membrane, since the graft chains were present in the form of a block copolymers between the hydrophilic polymeric compound and the hydrophobic polymeric compound, the hyrophobic polymeric compound which was stable from the standpoint of energy occurred prevalently in the direction of the surface while the membrane was in a dry state. When the membrane was exposed to water or an aqueous solution of blood plasma, for example, the hydrophilic polymeric compound moved toward the surface of the membrane to impart higher hydrophilicity to the surface and enable the membrane to be gradually wetted. When this membrane was tested for wetting time in accordance with Method B of ASTM D 4199-82 with necessary modifications, the wetting time was found to be 35 seconds.

To miniature modules of the porous membrane of this invention 24 cm$^2$ in surface area, bovine blood was directly supplied on the non-priming basis under varying sliding speeds of 400 and 1,000 cm$^{-1}$. The samples of separated blood plasma were assayed for free hemoglobin concentration along the course of time (0 to 1 minute, 2 minutes, and 3 minutes) to determine presence of absence of hemolysis. The increases of free hemoglobin concentrations (Δf—Hb) were invariably below 50 mg/dl, indicating no significant difference from the free hemoglobin concentration in the blood before the isolation of the blood plasma and denying the occurrence of hemolysis.

EXAMPLE 2

A porous membrane of polypropylene prepared by following the procedure of Example 1 was subjected to surface graft polymerization in the same manner as in Example 1 using methoxyethyl acrylate as a monomer under 1.0 torr for 3 minutes, to afford a porous membrane having a wetting time of 8 seconds. When this porous membrane was tested for hemolysis, it showed no sign of hemolysis.

EXAMPLE 3

A solution prepared by dissolving 18 parts by weight of polyvinylidene fluoride powder (produced by Mitsubishi Petro-Chemical Co., Ltd. and marketed under trademark designation of "Kynar K 301") in 73.8 parts by weight of acetone and 8.2 parts by weight of dimethyl formamide was cast on a polyethylene terephthalate film. The layer of the solution deposited on the film was immersed in a 1,1,2-trichlorotrifluoroethane bath for 5 minutes and dried, to afford a porous membrane of polyvinylidene fluoride having a wall thickness of 110 μm and an average pore diameter of 0.45 μm. By subjecting this membrane to surface graft polymerization with methoxyethyl acrylate in the same manner as in Example 2, a porous membrane having a wetting time of 130 seconds was obtained. When this porous membrane was tested for hemolysis, it showed not sign of hemolysis.

CONTROL 1

A porous membrane of polypropylene was prepared in the same manner as in Example 1 was subjected to surface graft polymerization with N,N-dimethyl acrylamide as a monomer in the same manner as in Example 1 under 0.8 torr for 3 minutes, to afford a porous membrane which was wetted instantaneously (within 2 seconds). When this porous membrane was tested for hemolysis, the blood plasma during the initial stage of filtration (0 to 1 minute) assumed a conspicuously reddish color, possessed a free hemoglobin concentration of about 1,400 mg/dl of blood plasma, and showed a sign of hemolysis readily discernible with unaided eyes.

CONTROL 2

A cellulose acetate membrane (produced by Advantech K.K.: 0.45 μm in pore diameter) as a hydrophilic porous membrane having a wetting time of less than 2 seconds was tested for hemolysis. It showed a sign of hemolysis.

CONTROLS 3 AND 4

A hydrophilic membrane having a wetting time of less than 2 seconds was obtained by coating the surface of the porous membrane of polypropylene used in Example 1 with an ethylene-vinyl alcohol copolymer (having a varying ethylene content of 29 mol % or 38 mol %). When the two samples were tested for hemolysis, they both showed a signal hemolysis discernible with unaided eyes.

EXAMPLE 4

Hollow fibers 240 μm in inside diameter, 50 μm in wall thickness, and 0.2 μm in pore diameter having a wetting time of 24 seconds were obtained by subjecting hollow fibers of polypropylene to surface graft polymerization using methoxyethyl acrylate as a monomer in the same manner as in Example 2. Two hundred (200) of such hollow fibers (about 10 cm in effective length) were stowed in a vessel provided with blood inlet and outlet and a blood plasma outlet and were fixed in place with polyurethane resin, to give rise to a blood plasma separator. This blood plasma separator was sterilized in an autoclave at 115° C. for 30 minutes. When it was tested for hemolysis by introducing therein blood in a flow rate of 10 ml/min, it showed no discernible sign of hemolysis.

CONTROL 5

A hollow fiber type porous membrane having a wetting time of less than 2 seconds were produced by coating the surface of a membrane with ethylene-vinyl alcohol copolymer (ethylene content 29 mol %) in the same manner as in Example 2. When this porous membrane was tested for hemolysis, it showed a conspicuous sign of hemolysis.

EXAMPLE 5

On one surface of a porous membrane of polypropylene (0.45 μm in pore diameter and 80 μm in wall thickness), minute projections 80 μin height were formed with UV-cured resin as illustrated in FIG. 1D. A blood plasma-separating membrane having a wetting time of 22 seconds and using graft chains of polymethoxyethyl acrylate was produced by subjecting the porous membrane to surface graft polymerization in the same manner as in Example 2. Flat membrane type blood plasma-separating membrane units illustrated in FIG. 2 and FIG. 4 were produced using the such blood plasma-separating membranes as mentioned above and stowed fast in place in a vessel provided with blood inlet and outlet and a blood plasma outlet. FIG. 4 illustrates part of the cross section of the flat membrane type blood plasma-separating membrane unit as magnified. As viewed from above, this flat membrane type blood plasma-separating membrane unit 11 assumed the shape of a doughnut possessing a through hole 28 at the center thereof. This flat membrane type blood plasma-separating membrane unit was constructed by opposing two blood plasma-separating membranes 23 and 23 of the present invention to each other across a coarse-mesh non-woven fabric 25 interposed therebetween in such a manner that the surfaces thereof bearing the minute projections facing outwardly, with heat-seal members 16 and 17 disposed so as to close hermetically the inner periphery and the outer periphery. The coarse-mesh non-woven fabric 25 functioned as a gas retaining member (flow path-forming member) for retaining a gap destined to form a fluid flow path between the porous membranes 23 and 23. The unit was provided with two through holes 18 and 19 adapted to allow circulation of a given fluid through the fluid flow path inside the filters.

A blood plasma separator was manufactured by superposing 10 flat membrane type blood plasma-separating membrane units (105 mm in outside diameter) inside a housing made of polycarbonate. When 450 g of human blood was directly supplied on the non-priming basis into the blood plasma separator and the blood plasma consequently isolated was collected, the blood plasma showed no signal of hemolysis. The ratio of protein recovery was not less than 98%.

Ratio of protein recovery = (Total protein concentration in separated blood plasma/total protein concentration in blood before isolation of blood plasma) × 100 (%).

CONTROL 6

A blood plasma separator was manufactured in the same manner as in Example 5 using a porous membrane of polypropylene (0.45 μm in pore diameter and 80 μm in wall thickness). When this separator was subjected to priming with physiological saline solution and then operated for separation of blood plasma, the ratio of protein recovery was 87%. The drop of this ratio indicated the presence of an effect of dilution with the physiological saline solution.

What is claimed is:

1. A method for separating blood into blood cells and plasma while preventing hemolysis, said method comprising the steps of:

preparing a hydrophilic porous membrane possessing a wetting time in the range of 3 to 300 seconds relative to water; and directly passing blood through said porous membrane in a dry state, thereby preventing hemolysis without the need to initially prime the membrane with liquid.

2. A method according to claim 1, wherein the wetting time is in the range of 5 to 60 seconds relative to water.

3. A method according to claim 1, wherein said porous membrane is prepared by coating a hydrophobic porous substrate with a polymeric compound.

4. A method according to claim 3, wherein said hydrophobic porous substrate is a porous membrane formed of one member selected from the group consisting of polyolefins, polyolefins having part or all of the hydrogen atoms thereof halogenated, and polyvinylidene fluoride.

5. A method according to claim 3, wherein said polymeric compound is a polymer having as a main component thereof at least one member selected from the group consisting of homopolymers and copolymers of alkoxyalkyl (meth)acrylates and copolymers of hydrophilic monomers with hydrophibic monomers.

6. A method according to claim 5, wherein said alkoxyalkyl (meth)acrylate is methoxyethyl acrylate.

* * * * *

UNITED STATES PATENT AND TRADEMARK OFFICE
CERTIFICATE OF CORRECTION

PATENT NO. : 5,244,578
DATED : September 14, 1993
INVENTOR(S) : Makoto OHNISHI et al It is certified that error appears in the above-indentified patent and that said Letters Patent is hereby corrected as shown below:

In Column 1, line 31, delete "rom" and insert -- from --.

In Column 1, line 57, delete "rom" and insert -- from --.

In Column 3, line 9, delete "therein" and insert -- wherein --.

In Column 5, line 29, delete "hydroxy" and insert -- hydroxyl --.

In Column 5, line 40, after "hydrophobic" insert -- porous --.

In Column 5, line 67, delete "are" and insert -- area --.

In Column 6, line 67, after "means" insert -- available at all. The extraction of solvent, the removal --.

In Column 7, line 15, delete "82 m" and insert -- $\mu$m --.

In Column 7, line 56, delete "10" and insert -- 100 --.

In Column 8, line 26, after "part" insert -- 4 --.

In Column 10, line 47, delete "a".

In Column 11, line 67, delete "signal" and insert -- sign of --.

UNITED STATES PATENT AND TRADEMARK OFFICE
CERTIFICATE OF CORRECTION

PATENT NO. : 5,244,578

DATED : September 14, 1993

INVENTOR(S) : Makoto OHNISHI et al

It is certified that error appears in the above-indentified patent and that said Letters Patent is hereby corrected as shown below:

In Column 13, line 3, delete "signal" and insert -- sign --.

Signed and Sealed this

Nineteenth Day of April, 1994

Attest:

BRUCE LEHMAN

*Attesting Officer*  *Commissioner of Patents and Trademarks*